US008706376B2

(12) United States Patent
Ono et al.

(10) Patent No.: US 8,706,376 B2
(45) Date of Patent: Apr. 22, 2014

(54) VEHICULAR ABS CONTROL SYSTEM WITH INTERNAL PARAMETER AUTOMATIC CALIBRATION FUNCTION

(75) Inventors: Shunsaku Ono, Yokohama (JP); Shuichi Miyagawa, Yokohama (JP)

(73) Assignee: Bosch Corporation, Tokyo (JP)

( * ) Notice: Subject to any disclaimer, the term of this patent is extended or adjusted under 35 U.S.C. 154(b) by 646 days.

(21) Appl. No.: 12/992,777

(22) PCT Filed: Aug. 22, 2008

(86) PCT No.: PCT/JP2008/064967
§ 371 (c)(1),
(2), (4) Date: Nov. 15, 2010

(87) PCT Pub. No.: WO2009/141923
PCT Pub. Date: Nov. 26, 2009

(65) Prior Publication Data
US 2011/0071744 A1 Mar. 24, 2011

(30) Foreign Application Priority Data

May 23, 2008 (JP) ................................. 2008-135456

(51) Int. Cl.
*B60T 7/00* (2006.01)
(52) U.S. Cl.
USPC ........ 701/75; 701/1; 701/21; 701/34; 701/51; 701/71; 701/93; 73/121; 303/113.4; 303/114.3; 303/115.4; 303/122.04; 303/139; 303/140; 303/152; 303/155; 303/156; 303/198; 280/261
(58) Field of Classification Search
USPC .................. 701/1, 21, 34, 51, 71, 93; 73/121; 303/113.4, 114.3, 115.4, 122.04, 139, 303/140, 152, 155, 156, 198; 280/261
See application file for complete search history.

(56) References Cited

U.S. PATENT DOCUMENTS

| | | | | |
|---|---|---|---|---|
| 4,846,534 A | * | 7/1989 | Leiber et al. ............... | 303/115.4 |
| 4,877,296 A | * | 10/1989 | Leiber et al. ............... | 303/113.4 |
| 5,011,236 A | * | 4/1991 | Toepfer et al. ............. | 303/198 |
| 5,163,742 A | * | 11/1992 | Topfer et al. .............. | 303/155 |
| 5,769,509 A | * | 6/1998 | Feigel et al. .............. | 303/152 |
| 6,325,469 B1 | * | 12/2001 | Carson et al. ............. | 303/140 |
| 6,382,739 B1 | * | 5/2002 | Ohtsu et al. ............... | 303/122.04 |
| 6,592,192 B1 | * | 7/2003 | Kaneda et al. ............. | 303/156 |
| 6,616,250 B1 | * | 9/2003 | Fennel et al. ............. | 303/139 |
| 2003/0195668 A1 | * | 10/2003 | Radtke et al. ............. | 701/1 |
| 2003/0225498 A1 | * | 12/2003 | Runde et al. .............. | 701/51 |

(Continued)

FOREIGN PATENT DOCUMENTS

| JP | 10108840 A | 4/1998 |
|---|---|---|
| JP | 2005532219 A | 10/2005 |

(Continued)

*Primary Examiner* — Muhammad Shafi
*Assistant Examiner* — Sanjeev Malhotra
(74) *Attorney, Agent, or Firm* — Michael Best & Friedrich LLP

(57) ABSTRACT

To provide an ABS control system and software with an automatic parameter calibration function. An ABS control system according to the present invention includes an electronic control unit (ECU), a wheel speed sensor, and a brake pressure sensor. The wheel speed sensor and the brake pressure sensor measure wheel speed and brake pressure during ABS braking, and the ABS control system automatically calibrates an internal parameter used in ABS control in response to the wheel speed and brake pressure measurement results.

6 Claims, 5 Drawing Sheets

(56) References Cited

U.S. PATENT DOCUMENTS

| | | | |
|---|---|---|---|
| 2004/0237638 A1* | 12/2004 | Reviol et al. | 73/121 |
| 2004/0243290 A1* | 12/2004 | Schmidt et al. | 701/34 |
| 2005/0173978 A1* | 8/2005 | Fennel et al. | 303/114.3 |
| 2006/0025894 A1* | 2/2006 | O'Connor et al. | 701/1 |
| 2006/0100766 A1 | 5/2006 | Schwarz et al. | |
| 2006/0149454 A1* | 7/2006 | Schweikert et al. | 701/71 |
| 2007/0158607 A1 | 7/2007 | Fey et al. | |
| 2007/0225891 A1* | 9/2007 | Saposnik | 701/93 |
| 2008/0015746 A1* | 1/2008 | Bertazzoni | 701/21 |
| 2008/0111342 A1* | 5/2008 | Niekerk et al. | 280/261 |
| 2011/0004362 A1* | 1/2011 | Wong et al. | 701/21 |

FOREIGN PATENT DOCUMENTS

| | | |
|---|---|---|
| JP | 2007500643 A | 1/2007 |
| JP | 2008017515 A | 1/2008 |
| JP | 2009275934 A | 11/2009 |
| WO | 0023384 A1 | 4/2000 |

\* cited by examiner

VEHICULAR ABS CONTROL SYSTEM WITH INTERNAL PARAMETER AUTOMATIC CALIBRATION FUNCTION

TECHNICAL FIELD

The present invention relates to an ABS control system that controls wheel brake pressure with an electronic control unit (ECU) installed in a vehicle and particularly relates to an ABS control system having the function of automatically calibrating an internal parameter. The present invention also relates to an ABS control program having the function of automatically calibrating an internal parameter and an ABS control program internal parameter calibration method.

BACKGROUND ART

Antilock brake systems (ABS) are generally installed in vehicles. Antilock brake systems are systems that stabilize steering of the vehicle and perform brake control such that the braking distance becomes as short as possible by easing up on the wheel brake force to eliminate skidding when it has been detected that the wheels are skidding at the time of braking and thereafter again increasing the brake force. Antilock brake systems are mainly configured from a hydraulic pressure modulator, wheel speed sensors, and an electronic control unit (ECU). The ECU processes signals, controls actuators inside the hydraulic pressure modulator, and controls the brake pressure. Generally, in antilock brake systems, the ECU judges the skidding tendency of the braked wheels on the basis of wheel speed signals from the wheel speed sensors and, when it judges that the braked wheels are in a skidding tendency, outputs a control signal to the modulator that adjusts the brake pressure. Thus, the modulator adjusts the brake pressure such that skidding of the braked wheels is eliminated.

ABS software ordinarily models ABS braking, and a control program is designed in accordance with that model. Various parameters are used in the ABS control program. By optimizing (calibrating) these parameters, ABS braking following the model is realized. The parameters used in ABS control vary depending on ABS braking models and control algorithms, but a parameter relating to the operating characteristic of the hydraulic pressure modulator, a parameter required by the ABS braking model, and a parameter relating to the braking characteristic of the vehicle are possible. These parameters relating to ABS control can be tentatively decided by the specifications of each component and simulations at the early design stage. However, it is not always the case that optimum ABS braking will be obtained with parameters that have tentatively been set by simulations or the like. For that reason, ABS braking tests are performed using an actual vehicle equipped with ABS software in which tentative parameters have been set, wheel speed, hydraulic pressure, and vehicle motion during ABS braking are measured, and each parameter is optimized (calibrated) on the basis of these actual measured values such that optimum ABS braking is obtained.

DISCLOSURE OF THE INVENTION

Problem to be Solved by the Invention

ABS control parameter calibration has conventionally been performed by analyzing the measured values of wheel speed and brake pressure during ABS braking in actual vehicle tests and, on the basis of the analysis results, deciding optimum parameters on the basis of design guidelines and the experience and know-how of the designer.

FIG. 8 schematically shows a conventional ABS software parameter decision procedure. First, using ABS software in which a tentative parameter has been set, ABS braking is performed in an actual vehicle test, and wheel speed, hydraulic pressure value, and vehicle motion during ABS braking are measured. Thereafter, these measured values are analyzed. Then, a new parameter is artificially decided from the analysis results on the basis of design guidelines and the experience and know-how of the designer. Then, the ABS software is changed on the basis of the decided parameter. Then, the changed ABS software is downloaded to the ECU. Moreover, whether or not optimum ABS braking will be obtained is further tested on the basis of the changed parameter. Here, if optimum ABS braking is obtained, parameter calibration ends, but when optimum ABS braking is not obtained, the above procedure is repeated.

In this manner, ABS control parameter calibration has required time. Particularly in recent years, in order to meet various brake performance needs, ABS braking models and ABS software algorithms are becoming more complex and the number of parameters is growing in accompaniment therewith, so ABS software development now requires even more time.

Therefore, the ABS design and manufacturing process can be significantly shortened if the work of deciding a parameter from the results of measurements that have artificially been carried out can be automated, a new parameter can be soon reflected in the ABS software during execution of an actual vehicle test, the actual vehicle test can be continued with the new parameter, and the parameter can be calibrated. From this standpoint, the present invention provides an ABS control system and software with an automatic parameter calibration function.

Means for Solving the Problem

An ABS control system according to the present invention includes an electronic control unit, a wheel speed sensor, and a brake pressure sensor. The wheel speed sensor and the brake pressure sensor measure wheel speed and brake pressure during ABS braking, and the electronic control unit automatically calibrates an internal parameter used in ABS control in response to the wheel speed and brake pressure measurement results.

The ABS control system according to one aspect of the present invention can automatically calibrate the internal parameter used in ABS control by (a) the wheel speed sensor and the brake pressure sensor measuring the wheel speed and the brake pressure during ABS braking and the electronic control unit calculating the internal parameter used in ABS control in response to the wheel speed and brake pressure measurement results and setting the calculated internal parameter as a new internal parameter used in ABS control.

The ABS control system according to one aspect of the present invention can automatically calibrate the internal parameter used in ABS control by further (b) judging whether or not the calculated internal parameter satisfies a predetermined condition and (c) ending calibration if it is judged that the calculated internal parameter satisfies the predetermined condition and again executing the procedure of (a) and (b) if it is judged that the calculated internal parameter does not satisfy the predetermined condition.

Further, the present invention provides an ABS control program that controls wheel brake pressure with an electronic control unit. The ABS control program of the present invention can automatically calibrate an internal parameter of the ABS control program in response to wheel speed and brake pressure that have been measured during ABS braking.

The ABS control program according to one aspect of the present invention can automatically calibrate the internal parameter of the ABS control program by (a) calculating the internal parameter of the ABS control program in response to the wheel speed and the brake pressure that have been measured during ABS braking and setting the calculated internal parameter as a new internal parameter of the ABS control program.

The ABS control program according to one aspect of the present invention can automatically calibrate the internal parameter of the ABS control program by further (b) judging whether or not the calculated internal parameter satisfies a predetermined condition and (c) ending calibration if it is judged that the calculated internal parameter satisfies the predetermined condition and again executing the procedure of (a) and (b) if it is judged that the calculated internal parameter does not satisfy the predetermined condition.

Further, the present invention provides a method of calibrating an internal parameter of an ABS control program that controls wheel brake pressure with an electronic control unit. The calibration method of the present invention includes the steps of: (a) measuring wheel speed and brake pressure during ABS braking; and (b) automatically calibrating the internal parameter in accordance with a predetermined algorithm of the ABS control program in response to the wheel speed and the brake pressure that have been measured.

In the ABS control program internal parameter calibration method according to one aspect of the present invention, step (b) includes the sub-steps of (b-1) calculating the internal parameter in accordance with the predetermined algorithm of the ABS control program in response to the wheel speed and the brake pressure that have been measured and (b-2) setting the calculated internal parameter as a new internal parameter of the ABS control program.

In the ABS control program internal parameter calibration method according to one aspect of the present invention, step (b) further includes the sub-steps of (b-3) judging whether or not the calculated internal parameter satisfies a predetermined condition and (b-4) ending calibration if it is judged that the calculated internal parameter satisfies the predetermined condition and again executing the procedure of (a), (b-1), (b-2), and (b-3) if it is judged that the calculated internal parameter does not satisfy the predetermined condition.

BEST MODE FOR CARRYING OUT THE INVENTION

Figure 1:
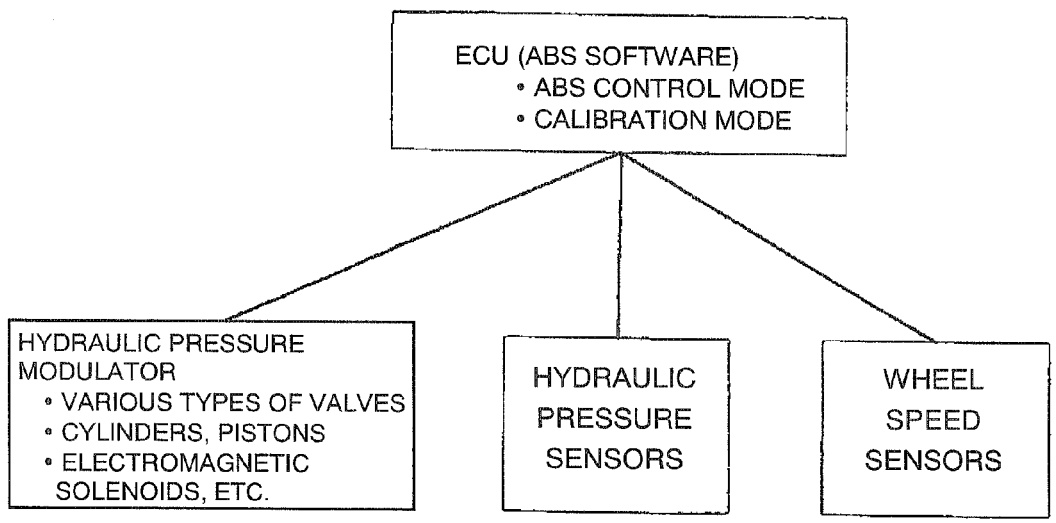
FIG. 1 is a diagram showing the system configuration of an ABS control system of the present invention.

An ABS control system of the present invention is, as shown in FIG. 1, configured from an ECU having an ABS control program (software) according to the present invention installed therein, a hydraulic pressure modulator (various types of valves, cylinders, pistons, electromagnetic solenoids, etc.), and various types of measurement sensors such as wheel speed sensors and hydraulic pressure sensors. The system configuration shown in FIG. 1 is not intended to limit the system configuration of the ABS control system of the present invention, and it is possible to increase or decrease the number of system components as long as it does not run counter to the aim of the present invention. The hardware configuration of the ABS control system of the present invention is the same as that of a conventional ABS control system aside from being equipped with the hydraulic pressure sensors and will not be described in detail in the present specification because it can be given an arbitrary configuration. In the ABS control system according to the present invention, the hydraulic pressure sensors are used in order to measure brake pressure during actual vehicle tests described later, and they need not be used in ABS braking.

The ABS control program according to the present invention can be realized by installing a parameter calibration function in a conventional ABS control program. The conventional ABS control program mentioned here is an ABS control program in which only an ABS control function is installed and which does not have an internal parameter calibrating function. In other words, the ABS control program of the present invention can be realized by installing an internal parameter calibrating function in addition to the conventional function of judging wheel skidding tendency from signals from wheel speed sensors or the like and controlling the hydraulic pressure modulator on the basis of these. The conventional ABS control function is publicly known and an arbitrary function can be used, so in the present specification, it will not be described in detail and only the internal parameter calibration function will be described below.

The ABS software calibration function of the present invention has the function of receiving measurement data from measurement instruments such as the wheel speed sensors and the hydraulic pressure sensors and analyzing the received data. The ABS software calibration function also has the function of using the data analysis results to calculate a new parameter and change the parameter to the new numerical value that has been calculated. The calibration function also has the function of judging whether or not the new parameter that has been calculated is optimum.

Figure 2:
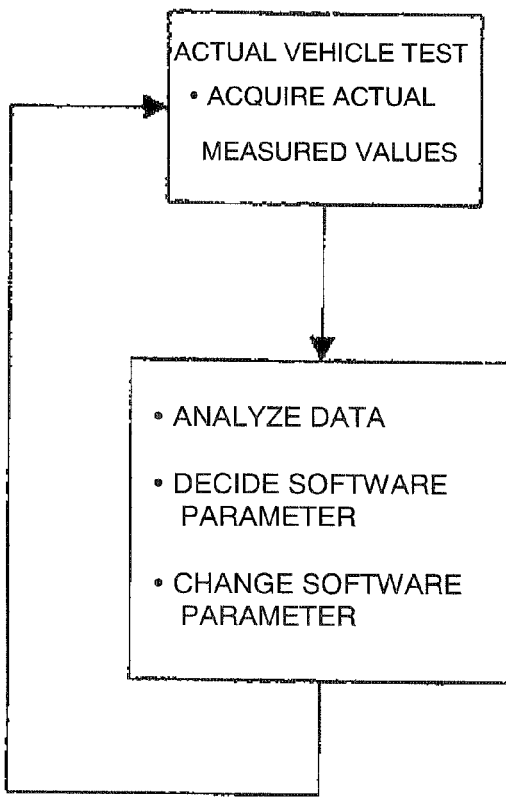
FIG. 2 is a diagram showing an internal parameter calibration procedure using ABS software of the present invention.

FIG. 2 schematically shows a flow of calibrating a parameter using the ABS software with the internal parameter calibration function according to the present invention. By using the ABS software according to the present invention, data analysis, parameter calculation, and parameter changes can be automated. Consequently, data acquisition can be done in an actual vehicle instantaneously using a new parameter that has been changed. Additionally, parameter calibration can be automated by incorporating in the software the function of determining whether or not a parameter has been optimized. In this manner, by using the ABS software according to the present invention, the calibration process can be shortened because changes to the ABS software accompanying a parameter change that have conventionally been necessary and downloading the changed ABS software to the ECU become unnecessary.

Figure 3:
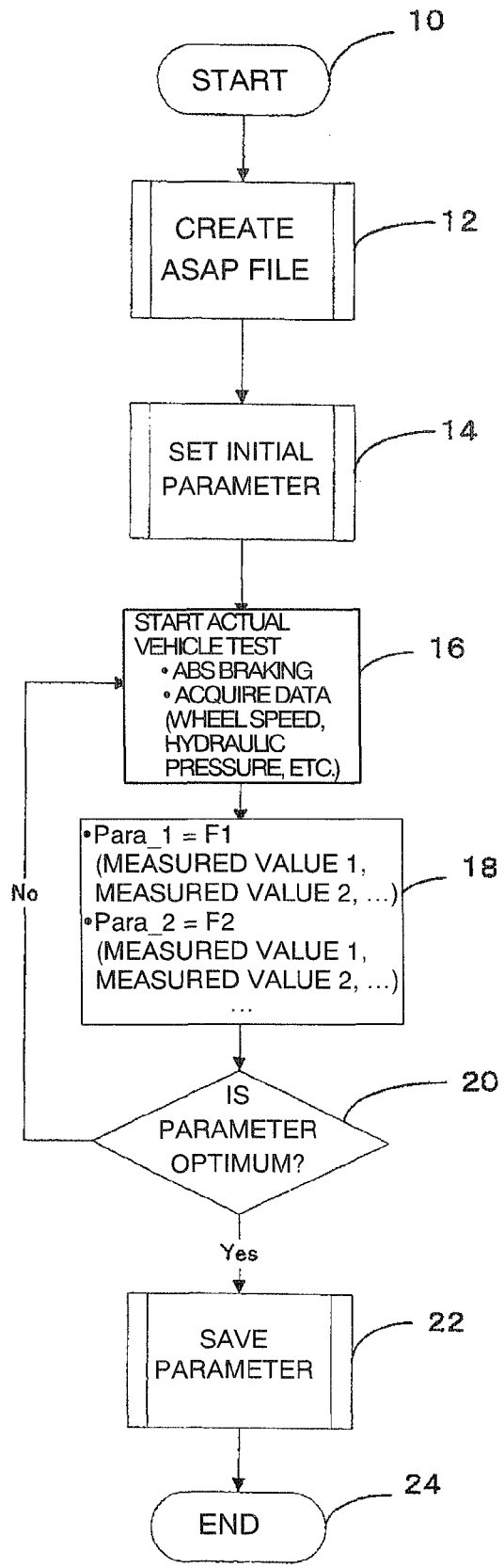
FIG. 3 is a diagram showing in greater detail the internal parameter calibration procedure using the ABS software of the present invention.

FIG. 3 shows in greater detail a typical flow when calibrating a parameter using the ABS software with the internal parameter calibration function according to the present invention.

First, the calibration function is started (step 10). At this stage, an environment needed for an actual vehicle test is prepared. That is, an actual vehicle in which the ECU having the internal parameter calibration function of the present invention has been installed is prepared.

Next, as ASAP file for calibration is created (step 12). The ASAP file is a standardized file for calibration that includes information regarding associated data objects inside the ECU, such as characteristic values (parameters, curves, maps), actual measured values, hypothetical measured values, dependency values, etc. The method of creating the ASAP file is publicly known and can be performed by an arbitrary method, so it will not be described in the present specification.

Next, a tentative (initial) parameter is set in the ABS software (step 14). The initial parameter can be recorded in an external file and set to a variable in the ABS software when the ABS software reads the external file. The initial parameter is decided beforehand depending on the specifications of each component such as the hydraulic pressure modulator and simulations. Further, the initial parameter may also be decided on the basis of results of having tested the initial parameter in a hypothetical simple test environment. The parameter can be defined as an internal variable (e.g., a global variable) such that it can be rewritten by the ABS software itself.

Next, an actual vehicle test is started (step 16). That is, the ABS software is started in a calibration mode. In the calibration mode, the number of times and the timing of ABS braking are defined, and the operator of the actual vehicle test operates the vehicle in accordance with the calibration mode. The brake operation procedure in the calibration mode can be arbitrarily decided. That is, it suffices for the brake operation procedure to be decided in response to a parameter calculation algorithm described in the ABS software. For example, when ABS braking is executed multiple times on the same conditions, plural measured values are obtained, and a parameter is calculated from these plural measured values in the same conditions (e.g., when a mean value is used, etc.), it suffices for the brake operation procedure to be decided such that ABS braking is repeated multiple times on the same conditions.

Next, wheel speed, hydraulic pressure, etc. are measured in ABS braking, and the ABS software receives these measured values and calculates each parameter in response to these measured values (step 18). Then, the calculated parameter is set as a new internal parameter of the ABS software. The ABS software can be programmed to have functions F1 to Fn per parameter to be calculated and calculate each parameter on the basis of the measured values it has received. It is preferable for the parameter decision functions to be created per parameter from the standpoint of maintenance and the like. The measured values utilized for parameter calculation are not limited to wheel speed and hydraulic pressure. That is, it suffices for measured values needed for the parameter calculation functions to be measured and for these to be used as needed. For example, in addition to wheel speed sensors and hydraulic pressure sensors, acceleration sensors and temperature sensors may be installed in the test vehicle, and the ABS software may be programmed to calculate a parameter using these measured values.

Next, it is judged inside the ABS software whether the parameter that has been calculated in step 18 has been optimized (step 20). Specifically, it is determined inside the ABS software whether or not the new parameter that has been calculated satisfies a predetermined condition. The judgment of whether or not the parameter has been optimized can be performed by various methods per parameter. For example, if the difference between a parameter before being changed and the parameter that has been calculated in step 18 is within a predetermined value, it may be judged that the parameters are sufficiently convergent and that the parameter that has been decided this time is an optimum parameter. Alternatively, multiple measurement and parameter calculation may be repeated, and a situation where the variance in the calculated parameter is within a predetermined value may be used as a basis for judging optimization. Alternatively, the repetition of actual vehicle measurement and parameter calculation a predetermined number of times may be used as a condition, and the mean value of the calculated parameters may be decided as an optimum parameter. In any event, it is desirable to decide the condition of optimization in consideration of the types and number of measurement data needed for parameter calculation, the parameter calculation algorithm, and the magnitude of the influence that parameter has on ABS control. Examples of automated parameter calculation procedures and optimization judgment methods will be described later.

If it is judged in step 20 that the parameter has been optimized, then the optimized parameter is saved in the external file (step 22) and calibration is ended (step 24). If it is judged in step 20 that the parameter has not been optimized, the flow returns to step 16 where ABS braking, measurement data acquisition, and parameter calculation are again executed anew for the newly set parameter and repeated until the parameter is optimized.

In this manner, in the present invention, arbitrary parameters used in ABS control can be calibrated automatically with ABS software. Further, the method of parameter calibration is arbitrary as long as it is a method that can be realized with software. As for the parameter calculation and optimization algorithm in the ABS software according to the present invention and the types of measurement data (wheel speed, brake pressure, etc.) needed for that and the number of times of data measurement, persons skilled in the art of this technical field can appropriately change these depending on the parameter.

Examples of ABS control parameters employable in the present invention and calibration methods thereof will be described below.

EXAMPLE 1

Calibration of a brake hydraulic pressure characteristic curve in a wheel pressure model will be described.

Figure 4:
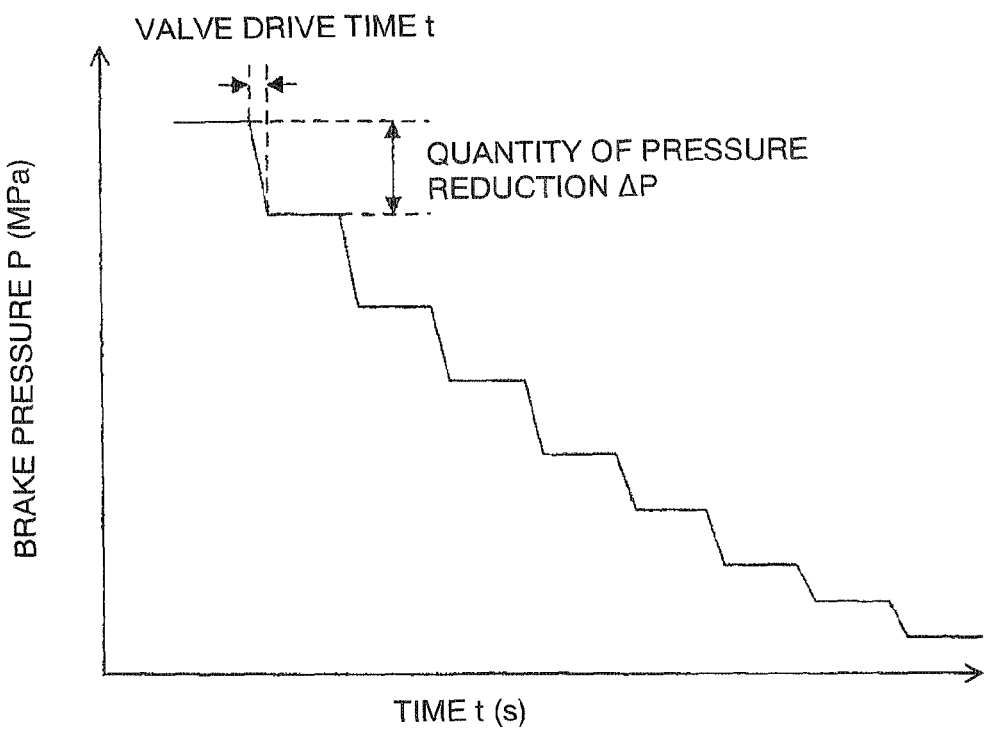
FIG. 4 is a diagram showing the relationship between the drive time and the pressure reduction quantity of a pressure reducing valve at each brake pressure.
Figure 5:
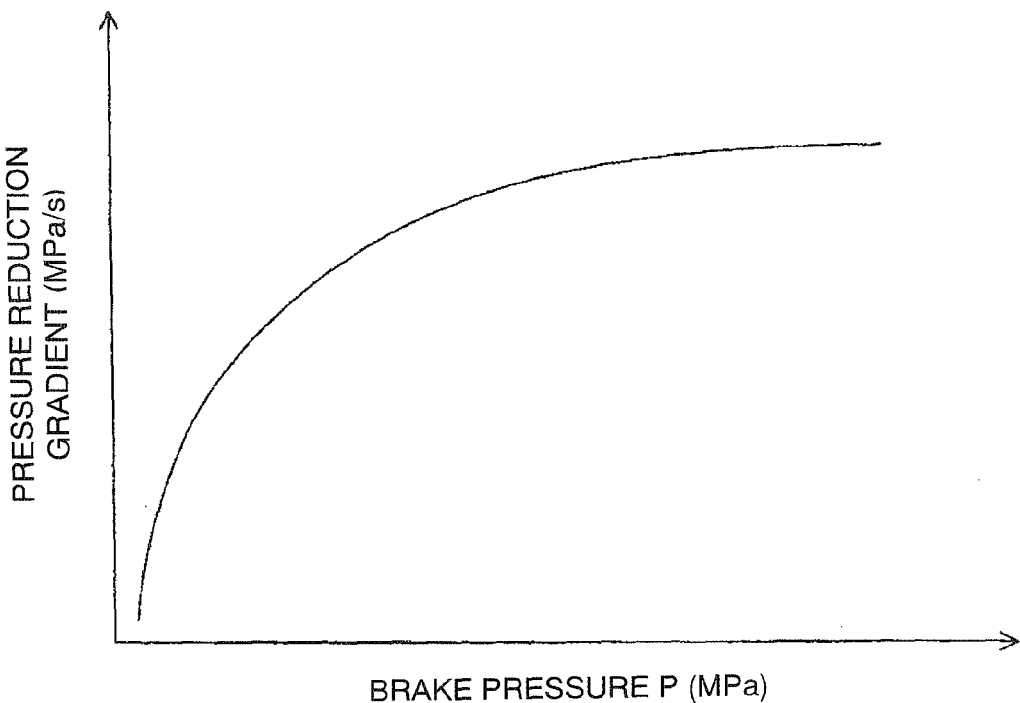
FIG. 5 is a diagram showing a brake pressure characteristic curve.

As shown in FIG. 4, a pressure reducing valve is driven for a certain amount of time and at regular intervals from a predetermined hydraulic pressure (e.g., about 10 MPa), and the hydraulic pressure values are measured. Thus, the hydraulic pressure gradient (MPa/s) at each hydraulic pressure can be calculated. By performing this per each wheel, a hydraulic pressure-hydraulic pressure gradient characteristic curve such as in FIG. 5 can be obtained per each wheel. The value of this characteristic curve is set in the ABS software as a new parameter. Regarding the method of optimizing the value of this characteristic curve, for example, the hydraulic pressure values can be measured multiple times and the mean value can be used as the optimum value. Alternatively, if the difference between the characteristic curve that has been calculated from the previous measurement and the characteristic curve that has been calculated from the measurement this time is equal to or less than a predetermined value, the measurement result this time may be judged to be the optimum value.

EXAMPLE 2

Calibration of the coefficient of braking force transmission in a braking force model will be described. The braking force relationship can be given by the following equation.

$$F(\text{braking force}) = m(\text{vehicle mass}) \times a(\text{deceleration})$$
$$= CP\_FA \times (P\_FL + P\_FR) + CP\_RA \times (P\_RL + P\_RR)$$

Here, CP_FA is the coefficient of braking force transmission of the front wheels, CP_RA is the coefficient of braking force transmission of the rear wheels, P_FL is the hydraulic pressure of the front left wheel, P_FR is the hydraulic pressure of the front right wheel, P_RL is the hydraulic pressure of the rear left wheel, and P_RR is the hydraulic pressure of the rear right wheel.

The coefficient of braking force transmission of the front wheels can be obtained with the equation CP_FA=m·a/(P_FL+P_FR) by restricting the brake hydraulic pressure of the rear wheels to 0 MPa and performing an actual vehicle test. The deceleration a can be estimated from the quantity of change in the wheel speed. The method of estimating the deceleration a from the quantity of change in the wheel speed is publicly known and can be performed by an arbitrary method, so it will not be described here. The coefficient of braking force transmission CP is dependent on temperature, so the measurement is repeated multiple times and the mean value is used as the optimum parameter and set in the ABS software. The coefficient of braking force transmission can be decided by the same procedure also in regard to the rear wheels.

EXAMPLE 3

Figure 6:
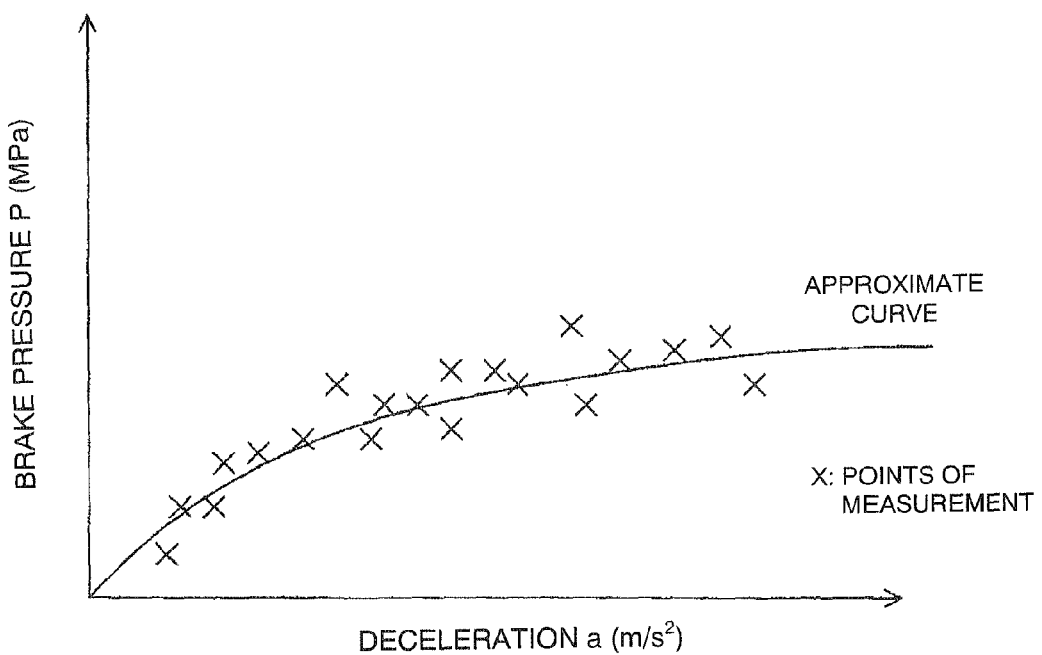
FIG. 6 is a diagram showing the relationship between a master cylinder hydraulic model value and deceleration.

A parameter relating to a master cylinder hydraulic pressure model will be described. The initial value of the master cylinder pressure model value at the time the ABS starts can be estimated from the deceleration of the wheels. The master cylinder pressure P at the time ABS control starts and the wheel deceleration a at that time can be measured to obtain an approximate curve and the optimum parameter like in FIG. 6. The approximate curve can be obtained by an arbitrary approximation method such as the least-square method. Different parameters may be used for the front wheels and the rear wheels.

Here, a threshold value of correction with respect to overbraking will be described. When the brake pedal force is increased, the wheel pressure increase gain rises, and the wheel motion and the ABS control cycle change. Therefore, in such cases, it is necessary to correct the master cylinder model value. The over-braking correction value is usually obtained from the wheel acceleration a, the differential a' thereof, and the control cycle T_cycle. That is, it is calculated by correction value OBR_Factor =f (a, a', T_cycle). In order to avoid unnecessary correction, the over-braking correction value is monitored in a state where the master cylinder pressure is constant, and a threshold value (parameter) for making the over-braking correction value effective is obtained. That is, when the over-braking correction value is equal to or greater than a certain threshold value (parameter), the calculated correction value is added to the master cylinder hydraulic pressure model value. This threshold value is set in the ABS software.

EXAMPLE 4

Figure 7:
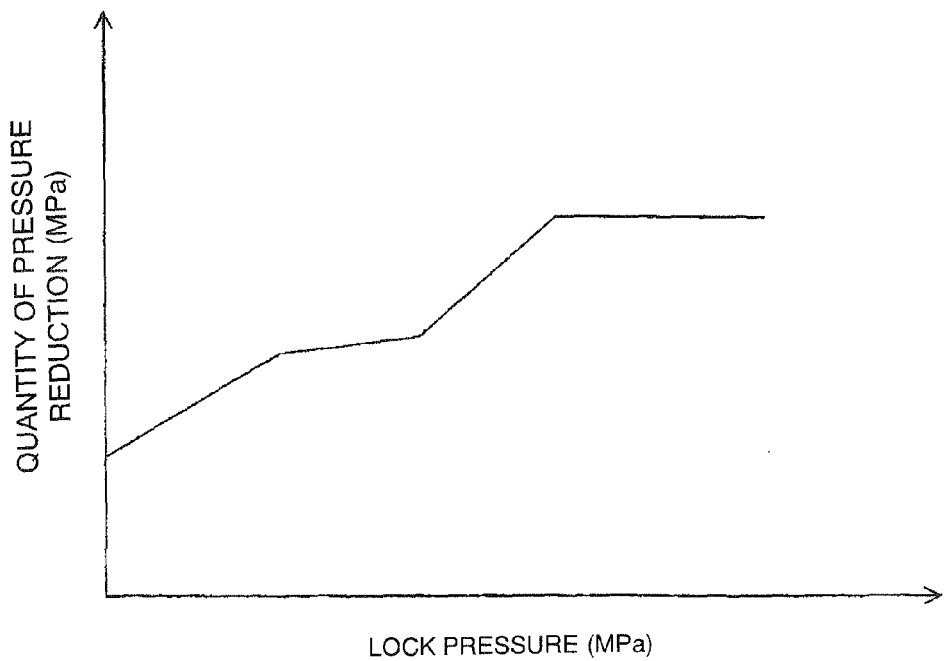
FIG. 7 is a diagram showing an ABS basic pressure reduction quantity.
Figure 8:
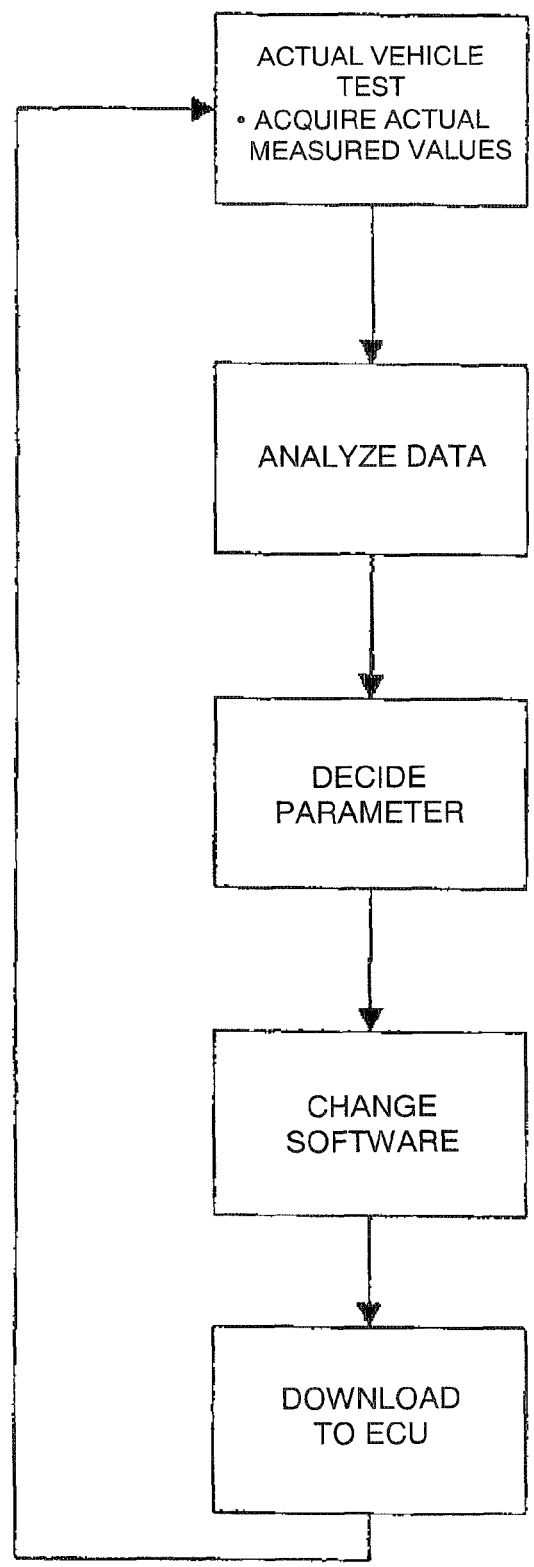
FIG. 8 is a diagram showing a conventional ABS software internal parameter calibration procedure.

An ABS pressure reduction quantity will be described. The basic pressure reduction quantity of the ABS is defined by a table such as in FIG. 7, for example, because it is adjusted to match each lock pressure. Calibration of the pressure reduction quantity is performed in response to wheel acceleration after pressure reduction. Specifically, it is adjusted such that wheel acceleration after pressure reduction becomes a predetermined target value. Basically, when the pressure reduction quantity is small, acceleration is also small, and when the pressure reduction quantity is large, acceleration also becomes large. Consequently, a new pressure reduction quantity can be calculated from the difference between the target value of wheel acceleration after pressure reduction and the measured value. New pressure reduction quantities can be plurally calculated, and the mean value can be used as the optimum value. Alternatively, if the difference between the target value of wheel acceleration after pressure reduction and the actual measured value is equal to or less than a predetermined value, the pressure reduction quantity may be judged to have been optimized. The decided pressure reduction quantity table (parameter) is set in the ABS software.

Several parameters and methods of calibrating those parameters employable in the ABS software with the automatic calibration function according to the present invention have been described above, but the parameters and methods of calibrating those parameters usable in the present invention are not limited to the above examples. The designer can freely set the needed parameter and method of calibrating that parameter in response to the ABS control format, the ABS system configuration, and the ABS control model. Depending on the parameter, it is possible that the parameter is described in the ABS software and that calibration cannot be automated. In such cases, a parameter whose calibration cannot be automated may be calibrated by a conventional method, and just the procedure of calibration of a parameter that can be automated may be incorporated in the ABS software.

As described above, the ABS software according to the present invention can automatically calibrate an internal parameter, so the calibration process can be significantly shortened as compared to conventional calibration methods.

Conventionally, parameters have been artificially decided on the basis of design guidelines and the experience and know-how of the designer on the basis of measured values in actual vehicle tests and analysis results. Additionally, in order for a decided parameter to be reflected in the ABS software, a procedure where the ABS software parameter is changed offline and downloaded to the ECU has been necessary. However, in the ABS software according to the present invention, the conventional procedure of artificial parameter decision and reflection is automated in the ABS software. Consequently, the calibration process can be shortened because a test can be performed with a new parameter without interrupting an actual vehicle test. Further, the procedure of conventional artificial parameter decision is eliminated and automated in software, so calibration can be performed without dependence on the skill of the designer, and, as a result, the quality of the ABS control system can be improved.

The invention claimed is:

1. An ABS control system that controls wheel brake pressure, the ABS control system including:

a wheel speed sensor;

a brake pressure sensor;

an electronic control unit configured to receive signals from the wheel speed sensor and the brake pressure sensor, the electronic control unit including a software having a calibration mode and an ABS control mode;

wherein when an actual vehicle test is performed using a vehicle equipped with said ABS control system and the calibration mode thereof, the wheel speed sensor and the brake pressure sensor measure wheel speed and brake pressure during ABS braking in the actual vehicle test, and the electronic control unit automatically calibrates a parameter of the software having the calibration mode and the ABS control mode in response to the wheel speed and brake pressure measurement results; and wherein the ABS control system automatically calibrates the internal parameter used in ABS control mode by further (b) judging whether or not the calculated internal parameter satisfies a predetermined condition and (c) ending calibration if it is judged that the calculated internal parameter satisfies the predetermined condition and again executing the procedure of (a) and (b) if it is judged that the calculated internal parameter does not satisfy the predetermined condition.

2. The ABS control system according to claim 1, wherein the ABS control system automatically calibrates the internal parameter used in ABS control mode by (a) the wheel speed sensor and the brake pressure sensor measuring the wheel speed and the brake pressure during ABS braking and the electronic control unit calculating the internal parameter used in ABS control in response to the wheel speed and brake pressure measurement results and setting the calculated internal parameter as a new internal parameter used in ABS control mode.

3. An ABS control program that controls wheel brake pressure with an electronic control unit, the ABS control program comprising a calibration mode and an ABS control mode, wherein the calibration mode is configured to automatically calibrate an internal parameter of the ABS control program in response to wheel speed and brake pressure that have been measured during ABS braking when an actual vehicle test is performed using a vehicle equipped with said control program and the calibration mode thereof; and wherein the calibration mode is configured to automatically calibrate the internal parameter of the ABS control program by further (b) judging whether or not the calculated internal parameter satisfies a predetermined condition and (c) ending calibration if it is judged that the calculated internal parameter satisfies the predetermined condition and again executing the procedure of (a) and (b) if it is judged that the calculated internal parameter does not satisfy the predetermined condition.

4. The ABS control program according to claim 3, wherein the calibration mode is configured to automatically calibrates the internal parameter of the ABS control program by (a) calculating the internal parameter of the ABS control program in response to the wheel speed and the brake pressure that have been measured during ABS braking and setting the calculated internal parameter as a new internal parameter of the ABS control program.

5. A method of calibrating an internal parameter of an ABS control program that controls wheel brake pressure with an electronic control unit, when an actual vehicle test is performed using a vehicle equipped with the ABS control program, the calibration method including the steps of: (a) measuring wheel speed and brake pressure during ABS braking; and (b) automatically calibrating the internal parameter in accordance with a predetermined algorithm of the ABS control program in response to the wheel speed and the brake pressure that have been measured; and wherein step (b) further includes the sub-steps of (b-3) judging whether or not the calculated internal parameter satisfies a predetermined condition and (b-4) ending calibration if it is judged that the calculated internal parameter satisfies the predetermined condition and again executing the procedure of (a), (b-1), (b-2), and (b-3) if it is judged that the calculated internal parameter does not satisfy the predetermined condition.

6. The calibration method according to claim 5, wherein step (b) includes the sub-steps of (b-1) calculating the internal parameter in accordance with the predetermined algorithm of the ABS control program in response to the wheel speed and the brake pressure that have been measured and (b-2) setting the calculated internal parameter as a new internal parameter of the ABS control program.

* * * * *